United States Patent
Bassett et al.

(10) Patent No.: US 10,932,550 B2
(45) Date of Patent: Mar. 2, 2021

(54) LANYARD ATTACHMENT FOR AN INPUT DEVICE

(71) Applicant: HEWLETT-PACKARD DEVELOPMENT COMPANY, L.P., Spring, TX (US)

(72) Inventors: Jonathan D. Bassett, Fort Collins, CO (US); David Quijano, Fort Collins, CO (US); Owen Richard, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/463,265

(22) PCT Filed: Feb. 3, 2017

(86) PCT No.: PCT/US2017/016392
§ 371 (c)(1),
(2) Date: May 22, 2019

(87) PCT Pub. No.: WO2018/144007
PCT Pub. Date: Aug. 9, 2018

(65) Prior Publication Data
US 2019/0343268 A1    Nov. 14, 2019

(51) Int. Cl.
*A45F 5/00*  (2006.01)
*G06F 3/0354*  (2013.01)

(52) U.S. Cl.
CPC ............ *A45F 5/00* (2013.01); *G06F 3/03545* (2013.01); *A45F 2005/006* (2013.01)

(58) Field of Classification Search
CPC ...... A44B 11/25; A45F 2005/006; A45F 5/00; G06F 3/03545
See application file for complete search history.

(56) References Cited

U.S. PATENT DOCUMENTS 521,726 A      6/1894   Morgan
5,832,573 A   11/1998   Howell
(Continued)

OTHER PUBLICATIONS

Stylus Tether, Wisdompro® 10 Pack of Detachable Elastic Coil Tether Strings / Lanyards with 3.5mm earphone jack for Stylus Pens—Black, May 29, 2016, < https://www.amazon.com/Wisdompro-Detachable-Lanyards-earphone/dp/B00MFTCM64?th=1 >.
(Continued)

*Primary Examiner* — Robert Sandy
*Assistant Examiner* — David M Upchurch
(74) *Attorney, Agent, or Firm* — HP Inc. Patent Department (57) ABSTRACT

In example implementations, a lanyard attachment is provided. The lanyard attachment includes a first body portion, a second body portion and a lanyard. The first body portion includes a first locking head and a first opening. The second body portion includes a second locking head and a second opening. The first body portion and the second body portion are positioned within an opening of an input device such that the first opening and the second opening are aligned exterior to the opening of the input device. The lanyard is coupled to the first body portion and the second body portion through the first opening and the second opening that are aligned.

15 Claims, 5 Drawing Sheets

100

(56) References Cited

U.S. PATENT DOCUMENTS

| | | | |
|---|---|---|---|
| 6,050,490 | A | 4/2000 | Leichner et al. |
| 7,650,007 | B2 | 1/2010 | Luliis et al. |
| 2003/0135966 | A1 | 7/2003 | Tejima |
| 2006/0197755 | A1 | 9/2006 | Bawany |
| 2009/0101418 | A1 | 4/2009 | Young et al. |
| 2009/0245931 | A1* | 10/2009 | Stiehl ............... H04M 1/04 403/322.2 |
| 2010/0037437 | A1 | 2/2010 | Buday |
| 2010/0206925 | A1* | 8/2010 | Fielding, Jr. ........ H04M 1/05 224/257 |
| 2012/0105223 | A1* | 5/2012 | Weil .................. A45F 5/00 340/539.11 |
| 2014/0263494 | A1 | 9/2014 | Treska |
| 2015/0033506 | A1* | 2/2015 | Leslie ................ A45F 3/14 24/3.4 |
| 2016/0088923 | A1* | 3/2016 | Koeck ................ A45F 5/00 24/3.1 |
| 2016/0183668 | A1* | 6/2016 | Grossman ........... A45F 5/00 224/576 |
| 2016/0286943 | A1* | 10/2016 | Andersen ........... A61F 11/12 |
| 2017/0119106 | A1* | 5/2017 | Leslie ................ A01K 27/005 |
| 2017/0119137 | A1* | 5/2017 | Cirincione, II ...... B25F 5/02 |
| 2017/0287311 | A1* | 10/2017 | Suryan .............. A45C 13/24 |

OTHER PUBLICATIONS

Type of Stylus for Your Touch Screen Device, Mar. 3, 2016, < http://www.ebay.com.au/gds/Type-of-Stylus-for-Your-Touch-Screen-Device-/10000000177629514/g.html >.

* cited by examiner

LANYARD ATTACHMENT FOR AN INPUT DEVICE

BACKGROUND

Computers and electronic devices have evolved from systems that use external input devices to enter information on a display to becoming touch screen devices. Some devices allow users to simply touch and point using a user's finger to provide inputs such as making a selection, manipulating a screen, and the like.

Some computers and electronic devices allow for more sophisticated inputs that use a finer touch from an input device. Some input devices may be relatively cheap, such as a plastic stylus. Other input devices may be relatively expensive, such as electronic pens that can be used to write or draw on electronic displays.

DETAILED DESCRIPTION

The present disclosure discloses a lanyard attachment for an input device and methods for connecting the lanyard attachment to the input device. As discussed above, some input devices may be relatively cheap, such as a plastic stylus. Other input devices may be relatively expensive, such as electronic pens that can be used to write or draw on electronic displays.

One example of an electronic pen may be an electro-optical pen. The electro-optical pen may convert light signals emitted by the electro-optical pen or a display device into an electric signal. The electric signal can be used by a device in communication with the electro-optical pen to provide location information, generate a mark on the display device (e.g., writing a line or text), and the like.

Examples of the present disclosure provide a lanyard attachment that provide some security for input devices. For example, the lanyard attachment may allow a user to wear the input device around his or her neck or wrist. The lanyard attachment may help prevent, or help deter, loss or theft of the input device.

Figure 1:
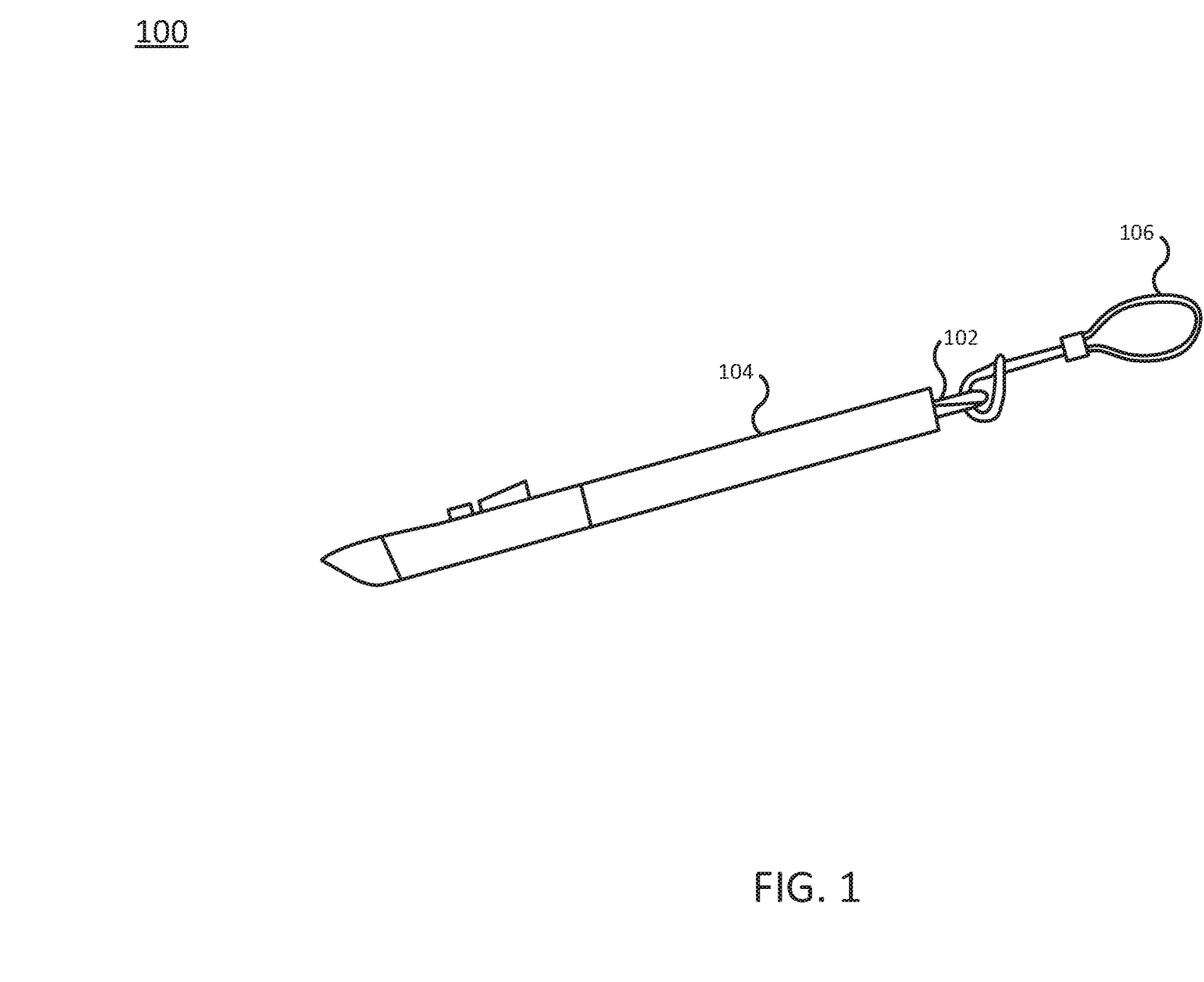
FIG. 1 is a block diagram of an example input device and lanyard attachment of the present disclosure.

FIG. 1 illustrates a block diagram of an example apparatus 100 comprising an input device 104, a lanyard attachment 102 and a lanyard 106. In one example, the input device 104 may be an electronic pen, electro-optical pen, electronic stylus, and the like, that can be used to write on electronic paper or digitized screens. For example, the movements of the input device 104 may be tracked or communicated to the electronic paper and converted into visible handwriting, lines, drawings, and the like.

The input device 104 may be relatively small and light. For example, the length of the input device 104 may be several inches and have a diameter of approximately 9-9.5 millimeters (mm).

In one implementation, the lanyard attachment 102 may be removably coupled to the input device 104. In one example, the present disclosure provides a multi-piece lanyard attachment 102 that can be connected to the input device 104. The lanyard attachment 102 may allow the input device 104 to be attached to the lanyard 106.

In one implementation, the lanyard 106 may allow the input device 104 to be worn by a user or tied to a larger device. For example, the lanyard 106 may be a loop that can be fit around a users neck or wrist. The potential for theft or losing the input device 104 may be minimized by attaching the input device 104 to the lanyard 106.

Figure 2:
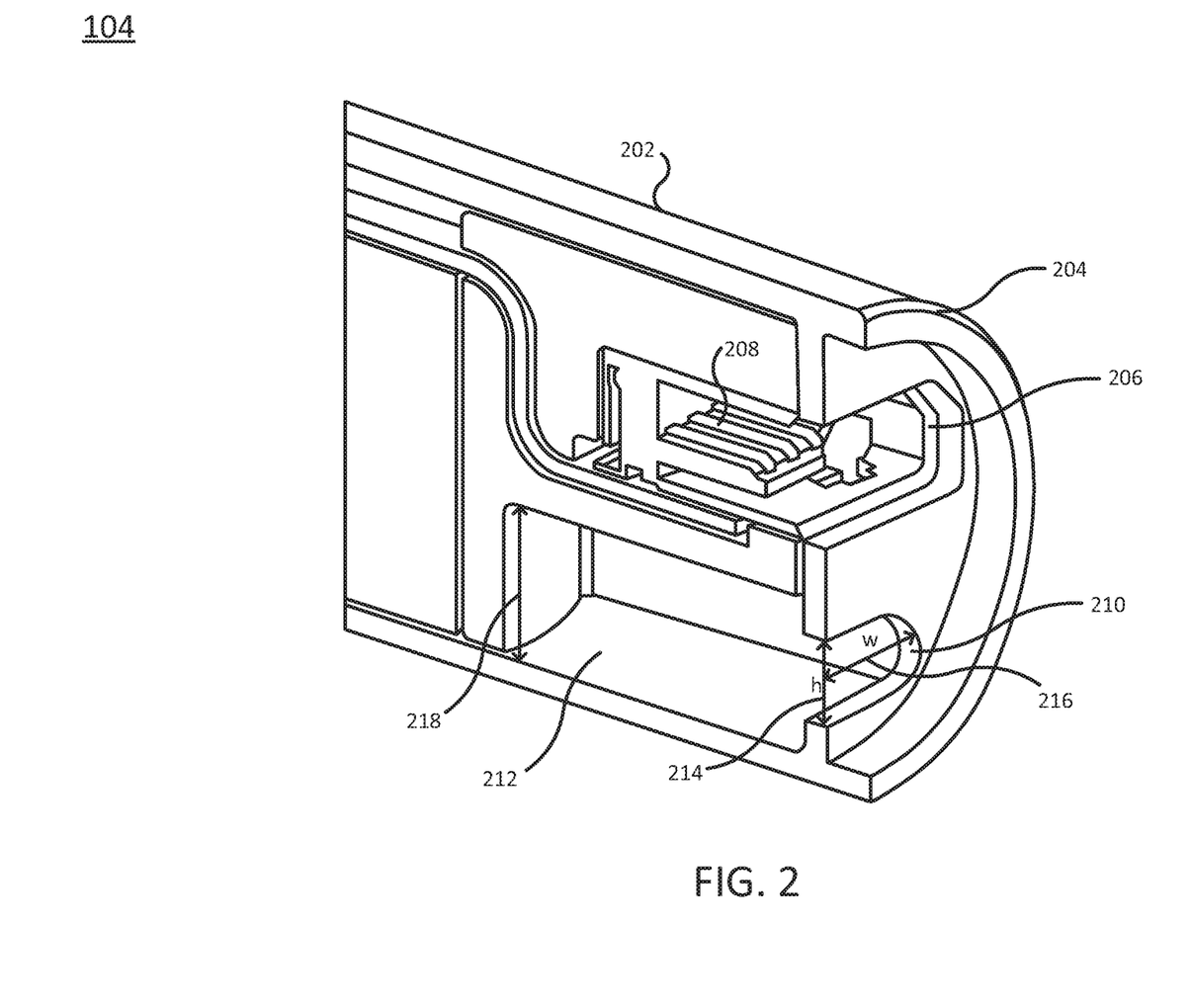
FIG. 2 is a block diagram of a cross-sectional view of an example connection end of an input device of the present disclosure.

FIG. 2 illustrates a cross-sectional view of a connection end 204 of the input device 104. For example, the connection end 204 may be located on an end opposite a tip of the input device 104 that is used to write on the electronic paper or digitized screen.

In one example, the connection end 204 may be formed in a body 202 of the input device 104. For example, the body 202 may be the external housing that encloses all of the internal circuitry and wiring of the input device 104. The body 202 may be fabricated from a plastic, a metal, a metalized plastic, anodized metal, and the like.

In one example, the connection end 204 may include an interface 208 and an opening 210. The interface 208 may be used to establish an electrical connection. In one implementation, the interface 208 may be located on the body 202 or on the connection end 204. In one example, the interface 208 may be a first opening on the connection end 204 (e.g., a universal serial bus (USB) connection). The dimensions of the opening of the interface 208 may be shaped and sized to accommodate the electrical connection (e.g., a USB connection).

In one implementation, where the interface 208 is a first opening, the opening 210 may also be referred to as the second opening 210 and be located adjacent to and below the opening. The second opening 210 may be used to receive the two-piece lanyard attachment 102. As noted above, the two-piece lanyard attachment 102 may secure the input device 104 to the lanyard 106.

In one implementation, the second opening 210 may have an internal volume 212 that is sized to accommodate the lanyard attachment 102. In addition, the second opening 210 may have dimensions (e.g., a height 214 and a width 216) that prevent the lanyard attachment 102 from being pulled out of the second opening 210. For example, a height 218 of the internal volume 212 may be larger than a height 214 of the second opening 210 to fit the lanyard attachment 102, but prevent the lanyard attachment 102 from being removed, or disconnected, from the input device 104. In one example, the second opening 210 may have a height of approximately 1.5 mm and a width of approximately 3.5 mm.

To illustrate, dimensions of the second opening 210 may be larger than the dimensions of each piece of the lanyard attachment 102 to allow each piece of the lanyard attachment 102 to fit through the dimensions of the second opening 210 individually. However, the dimensions of the second opening 210 may be smaller than the dimensions of the lanyard attachment 102 when each piece is combined. As a result, the lanyard attachment 102 may be prevented from being disconnected from the input device 104 once inserted through the second opening 210 and into the internal volume 212.

Figure 3:
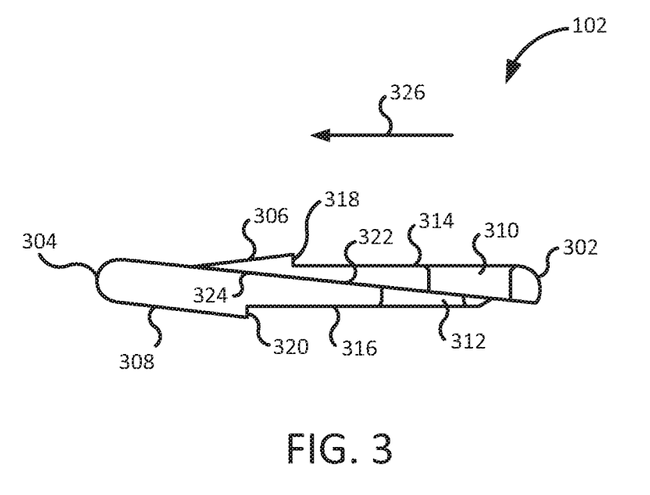
FIG. 3 is a block diagram of an example side view of a lanyard attachment of the present disclosure.
Figure 4:
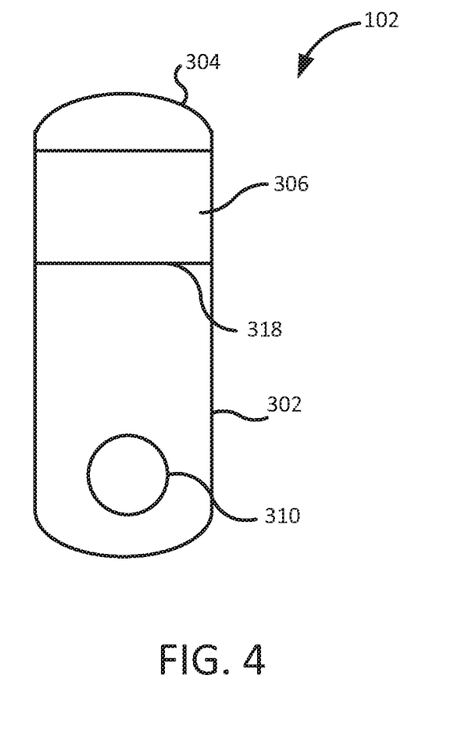
FIG. 4 is a block diagram of an example top view of the lanyard attachment.

FIGS. 3 and 4 illustrate a side view and a top view, respectively, of the multi-piece lanyard attachment 102. FIG. 3 illustrates an example that uses two pieces for the lanyard attachment 102. However, it should be noted that any number of pieces may be used that can be combined to form the lanyard attachment 102 that can be secured within the second opening 210.

In one example, the lanyard attachment 102 may include a first body portion 302 and a second body portion 304. The first body portion 302 and the second body portion 304 may be combined to form the lanyard attachment 102, as discussed in further detail below. In one implementation, the first body portion 302 and the second body portion 304 may each have a wedge shape that combine to a form an arrow shape looking from a side profile.

For example, the first body portion 302 may include a first locking head 306 and a first opening or a first lanyard attachment opening 310. The first opening 310 may be located on an opposite end as the first locking head 306. The first locking head 306 may include an angled head portion that includes a lip portion 318. The first body portion 302 may include a flat top side 314 and an angled bottom side 322. In one example, the first opening 310 may be formed as a circle, or any other two dimensional shape, in through the flat top side 314 and the angled bottom side 322.

In one example, the second body portion 304 may include a second locking head 308 and a second opening or a second lanyard attachment opening 312. The second opening 312 may be located on an opposite end as the second locking head 308. The second locking head 308 may include an angled head portion that includes a lip portion 320. The second body portion 304 may include a flat bottom side 316 and an angled top side 324. In one example, the second opening 312 may be formed as a circle, or any other two dimensional shape, in through the flat bottom side 316 and the angled top side 324.

In one example, the first body portion 302 and the second body portion 304 may be combined and aligned such that the first opening 310 and the second opening 312 are aligned. For example, FIG. 4 illustrates a top view of the first body portion and the second body portion 304. The first opening 310 and the second opening 312 are aligned such that they are concentric. In other words, the perimeters of the first opening 310 and the second opening 312 lie on top of one another. For example, no portion of the angled top side 324 of the second body portion 304 is visible through the first opening 310. In addition, no portion of the angled bottom side 322 of the first body portion 302 would block or overlap any portion of the second opening 312.

Referring back to FIG. 3, it can be seen that as the angled bottom side 322 moves laterally (as shown by an arrow 326) an overall height of the lanyard attachment 102 may increase. When the first body portion 302 and the second body portion 304 are properly aligned, the lanyard attachment 102 may appear to have a shape of an arrow. In other words, the lanyard attachment may have a combined locking head that grows gradually wider from a tip out towards the respective lip portions 318 and 320 and has a tail that is narrower than the combined locking head formed by the height measured from the flat top side 314 to the flat bottom side 316.

In one implementation, the first body portion 302 and the second body portion 304 may be fabricated from an inflexible material. In other words, any material that will prevent the dimensions of the lanyard attachment 102 from being compressed to "squeeze" through the dimensions of the second opening 210 of the input device 104 may be used. For example, the inflexible material may be a metal, a metal alloy, an anodized metal, a hard plastic, and the like.

It should be noted that the terms "first" and "second" are used above to distinguish between different parts or pieces of the two piece lanyard attachment 102. The terms "first" and "second" do not connote any order or sequence. Rather, the terms "first" and "second" are used as identifying labels to differentiate from one another. In other words, the label "first" could just as easily be used to refer to the "first" body portion 304, rather than the "second" body portion 304. Similarly, the label "second" could just as easily be used to refer to the "second" body portion 302, rather than using the "first" body portion 302.

Figure 5:
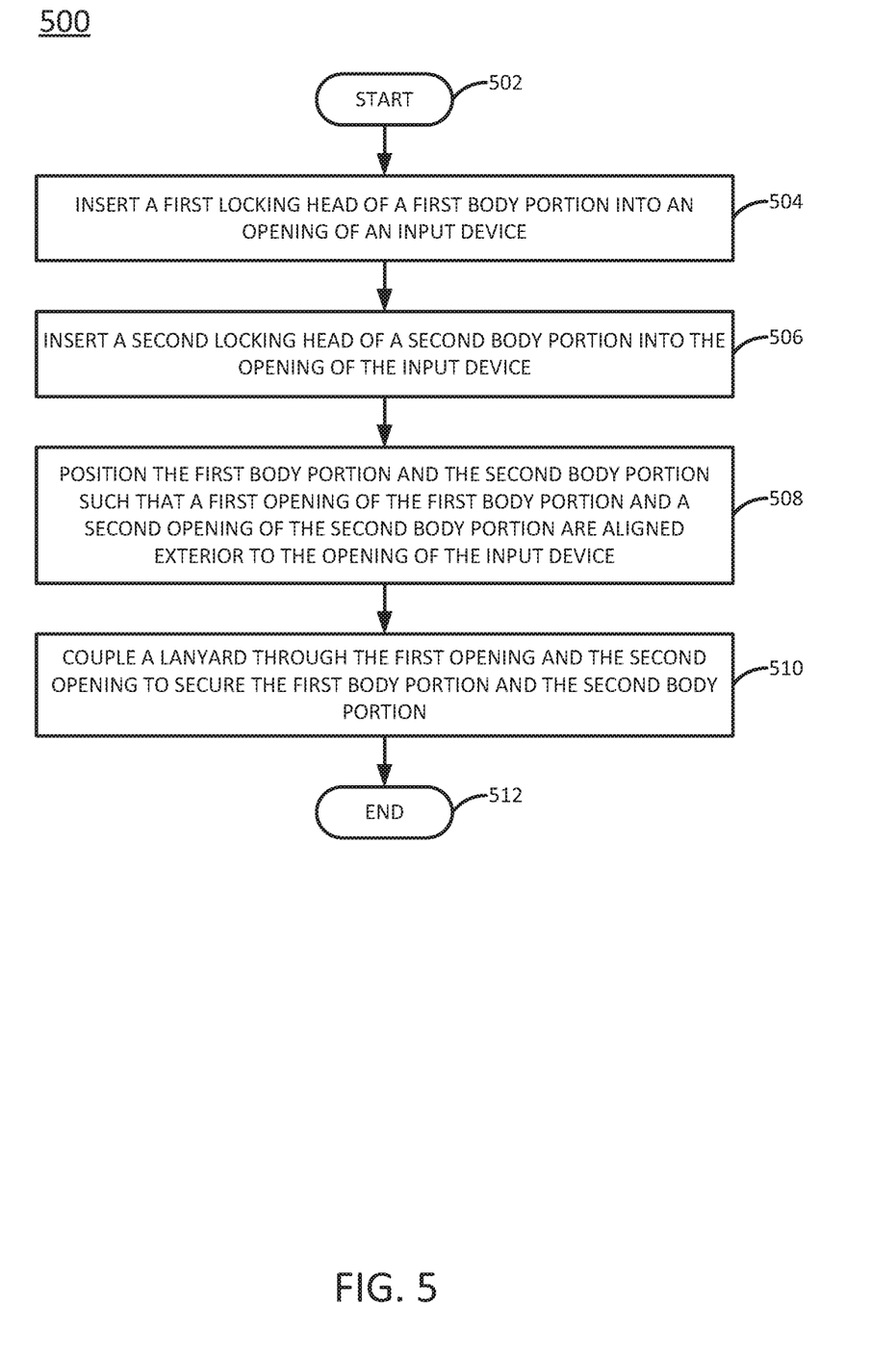
FIG. 5 is a flow diagram of an example method for connecting a lanyard attachment to an input device of the present disclosure.
Figure 6:
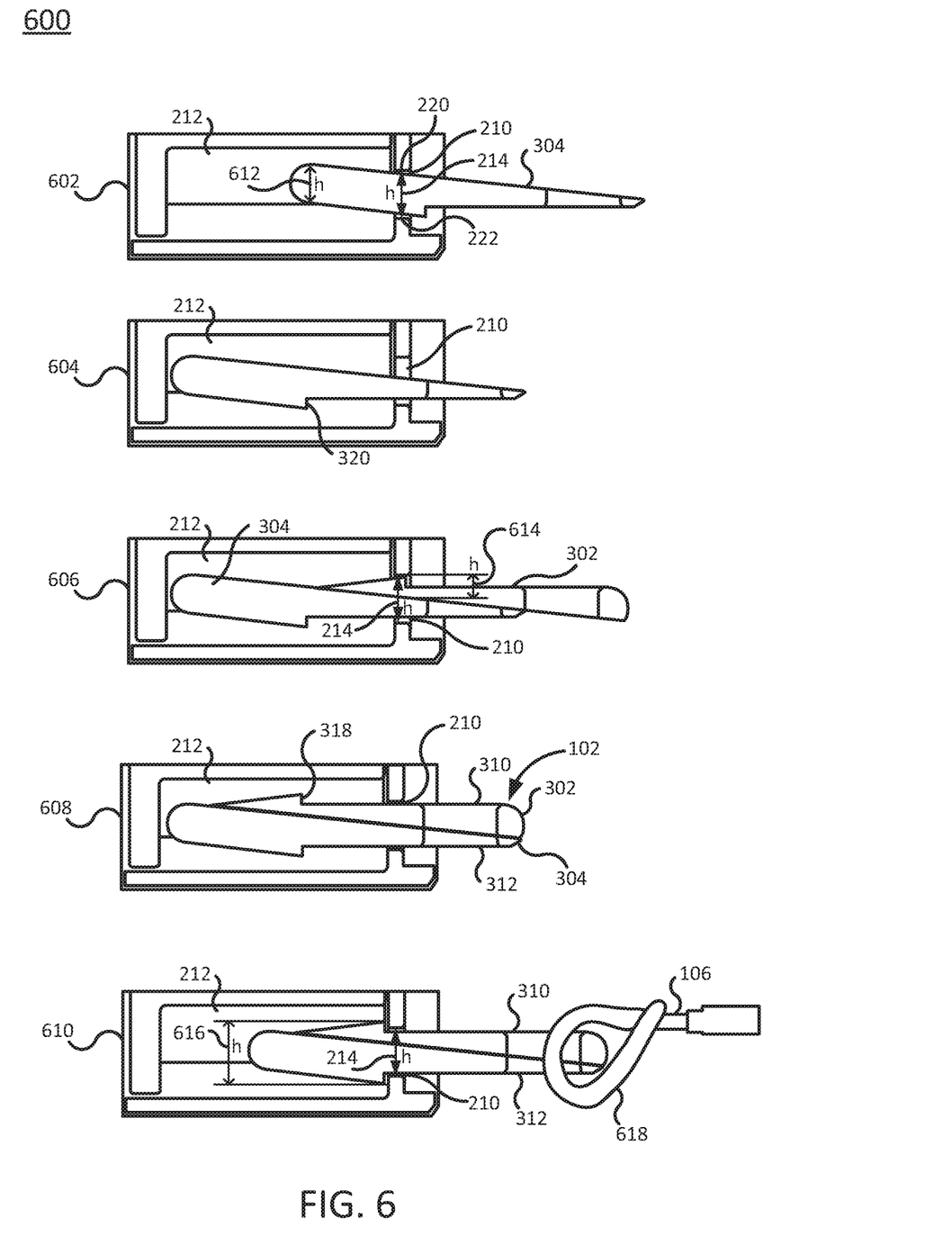
FIG. 6 is a process flow diagram of an example method for connecting a lanyard attachment to an input device of the present disclosure.

FIG. 5 illustrates a flow diagram of an example method 500 for connecting a lanyard attachment to an input device. FIG. 6 illustrates a process flow diagram 600 that illustrates the method 500 for connecting a lanyard attachment to an input device. In one example, the method 500 and the process flow diagram 600 may be performed using the two-piece lanyard attachment 102 illustrated in FIG. 1. The blocks 602-610 of the process flow diagram 600 may be referred to when discussing the method 500 to help illustrate the steps described by blocks 502-512 below.

At block 502, the method 500 begins. At block 504, the method 500 inserts a first locking head of a first body portion into an opening of an input device. For example, as illustrated in FIG. 5 at block 502, the first body portion 304 (referred to as the "second body portion 404" in FIGS. 3 and 4) is inserted through the second opening 210. As noted above, the dimensions of the each individual piece of the two-piece lanyard attachment 102 may be smaller than the dimensions of the second opening 210. In one example, the dimensions may refer to a height 612 of the first body portion 304 and the height 214 of the second opening 210.

In one example, the height 612 of the first body portion 304 may be a thickest portion of the first body portion 304. The height 214 may be measured from a bottom surface of a top wall 220 and a top surface of a bottom wall 222 that form the second opening 210. In one example, the height 612 may be smaller than the height 214 to allow the first body portion 304 to pass through the second opening 210.

In one example, as shown in block 604 of FIG. 6, the first body portion 304 may be inserted through the second opening such that the lip portion 320 passes through the second opening 210 and into the internal volume 218.

Referring back to FIG. 5, at block 506, the method 500 inserts a second locking head of a second body portion into the opening of the input device. For example, as illustrated in FIG. 6 at block 606, the second body portion 302 (referred to as the "first body portion 302" in FIGS. 3 and 4) is inserted through the second opening 210. As noted above, the dimensions of the each individual piece of the two-piece lanyard attachment 102 may be smaller than the dimensions of the second opening 210. In one example, the dimensions may refer to a height 614 of the second body portion 302 and the height 214 of the second opening 210.

In one example, the height 614 of the second body portion 302 may be a thickest portion of the second body portion 302. In one example, the height 614 may be smaller than the height 214 to allow the second body portion 302 to pass through the second opening 210.

In one example, as shown in block 608 of FIG. 6, the second body portion 302 may be inserted through the second opening such that the lip portion 318 passes through the second opening 210 and into the internal volume 218.

At block 508, the method 500 positions the first body portion and the second body portion such that a first opening of the first body portion and a second opening of the second body portion are aligned exterior to the opening of the input device. As shown in block 608 in FIG. 6, the first body portion 304 and the second body portion 302 are aligned to form the lanyard attachment 102. As noted above, the first body portion 304 and the second body portion 302 are aligned such that the first opening 312 and the second opening 310 (referred to as the second opening 312 and the first opening 310 in FIGS. 3 and 4) are aligned. In addition, the first opening 312 and the second opening 310 may located exterior to the second opening 210. Said another way, the first opening 312 and the second opening 310 are located outside of the internal volume 212.

In one implementation, the first body portion 304 and the second body portion 302 may have a mating surface on the angled flat surfaces 324 and 322, respectively. For example, the angled flat surface 324 may have an opening and the angled flat surface 322 may have a protruding member that is the same shape as the opening. The second body portion 302 may be slid laterally into the internal volume 212 against the first body portion 304 until the protruding member mates with the opening. Thus, the mating surface may help to provide feedback as two when the first body portion 304 and the second body portion 302 are properly positioned and that the first opening 312 and the second opening 310 are properly aligned.

As noted above, when the first body portion 304 and the second body portion 302 are properly positioned to form the lanyard attachment 102, the lanyard attachment 102 appears to have an arrow shape. The height 612 and 614 forms a combined height 616 of the lanyard attachment 102. The combined height 616 may be the thickest part of the lanyard attachment 102. In one example, the combined height 616 may be measured from a corner of the lip portion 320 to a corner of the lip portion 318. The lines adjacent to the height 616 illustrated in block 610 of FIG. 6 show the measurement of the corner of the lip portion 320 to the corner of the lip portion 318. The combined height 616 may be larger than the height 214 of the second opening 210. As a result, the lanyard attachment 102 may be prevented from being removed from the internal volume 212 of the input device 104. Said another way, the lanyard attachment 102 may not be disconnected from the input device 104.

Referring back to FIG. 5, at block 510, the method 500 couples a lanyard through the first opening and the second opening to secure the first body portion and the second body portion. For example, the lanyard 106 may be tied to form a loop 618 through the first opening 312 and the second opening 310. The loop 618 may be tightened enough to prevent the first body portion 204 and the second body portion 302 from be slid apart to be individually removed through the second opening 210. For example, the diameter of the loop 618 may be sized to limit an amount movement between the first body portion 304 and the second body portion 302 to prevent the first body portion 304 or the second body portion 302 from being removed through the second opening 210. Referring back to FIG. 5, the method 500 ends at block 512.

It should be noted that FIG. 6 illustrates one example of how multiple pieces of the lanyard attachment 102 can be combined into the second opening 210 to secure the lanyard attachment 102 to the input device 104. However, it should be noted that other mechanical features may be used, or added, to combine the multiple pieces of lanyard attachment 102. For example, mechanical features such as, magnetized body portions, adhesives, set screws, spring-loaded pins, and the like, may also be used.

In other examples, the multiple pieces of the lanyard attachment 102 may not be completely detached. For example, the first body portion 304 and the second body portion 302 may be movably (e.g., via a sliding mechanism or a rotating mechanism) attached to allow the first body portion 304 to be inserted into the second opening 210 and sliding, or rotating, the second body portion 302 into the second opening 210 to be combined with the first body portion 304 to form the lanyard attachment 102. Thus, the illustrated examples provided herein are provided as examples and should not be considered limiting.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A lanyard attachment, comprising:
    a first body portion comprising an angled head portion that includes a lip portion that forms a first locking head and a first opening; and
    a second body portion comprising a second locking head and a second opening, wherein the first body portion and the second body portion combine to form the lanyard attachment when positioned within an opening of an input device such that the first opening and the second opening are aligned exterior to the opening of the input device.

2. The lanyard attachment of claim 1, wherein the first body portion comprises:
    a flat top side; and
    an angled bottom side, wherein the first opening is on an opposite end as the angled head portion that includes the lip portion.

3. The lanyard attachment of claim 1, wherein the second body portion comprises:
    a flat bottom side;
    an angled head portion that includes a lip portion that forms the second locking head; and
    an angled top side, wherein the second opening is on an opposite end as the angled head portion that includes the lip portion.

4. The lanyard attachment of claim 1, wherein the first body portion and the second body portion each comprises an inflexible material.

5. The lanyard attachment of claim 1, comprising:
    a lanyard coupled to the first body portion and the second body portion through the first opening and the second opening that are aligned.

6. The lanyard attachment of claim 1, wherein a height of the first locking head and the second locking head combined is larger than a height of the opening.

7. A method comprising:
    inserting a first locking head of a first body portion into an opening of an input device, wherein the first locking head is formed by an angled head portion that includes a lip portion;
    inserting a second locking head of a second body portion into the opening of the input device;
    positioning the first body portion and the second body portion such that a first opening of the first body portion and a second opening of the second body portion are aligned exterior to the opening of the input device; and coupling a lanyard through the first opening and the second opening to secure the first body portion and the second body portion.

8. The method of claim 7, wherein the first locking head is inserted into the opening until the first locking head contacts an inner wall of the opening to provide enough space in the opening to insert the second locking head of the second body portion.

9. The method of claim 7, wherein a height of the first locking head and the second locking head combined is larger than a height of the opening.

10. The method of claim 7, wherein a diameter of a loop of the lanyard is sized to limit an amount movement between the first body portion and the second body portion to prevent the first body portion or the second body portion from being removed through the opening.

11. An input device, comprising:
   a body;
   a connection end;
   an interface on the body or the connection end to establish an electrical connection; and
   an opening in the connection end to receive a two-piece lanyard attachment that comprises an angled head portion that includes a lip portion and secures the input device to a lanyard.

12. The input device of claim 11, wherein the interface comprises a second opening in the connection end, wherein the second opening is adjacent to the opening.

13. The input device of claim 11, wherein the opening comprises dimensions that are larger than each piece of the two-piece lanyard attachment.

14. The input device of claim 13, wherein the opening comprises dimensions that are smaller than the two-piece lanyard attachment when the each piece is combined to form the two-piece lanyard attachment.

15. The input device of claim 11, wherein the each piece of the two-piece lanyard attachment comprises:
   a flat bottom side;
   and
   a flat top side, wherein a lanyard attachment opening is on an opposite end as the angled head portion that includes the lip portion.

* * * * *